3,291,827
PROCESS FOR PREPARING N,N'-DICYANO-AMIDINE SALTS

Kenneth Robert Huffman, Stamford, Conn., and Frederic Charles Schaefer, Munich-Solln, Germany, assignors to American Cyanamid Company, Stamford, Conn., a corporation of Maine
No Drawing. Filed Mar. 5, 1963, Ser. No. 262,850
4 Claims. (Cl. 260—551)

This invention relates to a process for preparing N,N'-dicyanoamidine salts. More particularly, it relates to a process for preparing N,N'-dicyanoamidine alkali metal salts.

J. T. Shaw in J. Org. Chem., 27, 3890 (1962), reports the preparation of certain dicyanoamidine salts. One of the methods there disclosed involves the reaction of imidate hydrochlorides with sodium acid cyanamide. However, the author mentions that this method was successful only when lower alkyl imidate hydrochlorides were employed. The reaction employing longer chain alkyl imidate hydrochlorides, such as ethyl laurimidate hydrochloride, gave no characterizable products while the use of an aryl imidate, methyl benzimidate hydrochloride, afforded only a small amount of benzoguanamine as the only characterizable product.

It has now been discovered that N,N'-dicyanoamidine salts of the formula:

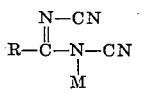

in which R is selected from the group consisting of aryl and halo-, nitro- and alkyl-substituted aryl and M is an alkali metal such as sodium, potassium and lithium may be prepared by a simple method which affords the N,N'-dicyanoamidine salts in good yield.

In contrast to the method described by Shaw and referred to hereinabove, the process of the present invention is applicable for the preparation of a wide class of alkyl- and aryl-substituted-N,N'-dicyanoamidine alkali metal salts.

In accordance with the present invention, it has been found that N,N'-dicyanoamidine alkali metal salts may be prepared by the reaction of an N-cyanoimidate with an alkali metal cyanamide in an inert reaction medium at temperatures of from about 0° to about 50° C., preferably from about 30° to about 50° C., according to the following equation:

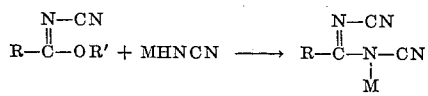

in which R and M are as defined hereinabove and in which R' is lower alkyl, e.g., methyl, ethyl, propyl, isopropyl, butyl and isobutyl.

The reactant, N-cyanoimidates, which are employed in the process of this invention, are described and claimed in copending application Serial No. 262,851 filed concurrently herewith, now U.S. Patent 3,225,077.

As described therein, the N-cyanoimidate reactant is synthesized by four alternative methods as represented by Equations A to D:

(A)
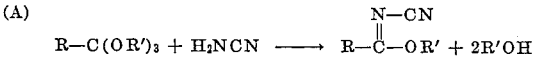

(B)
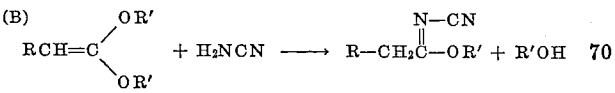

(C)
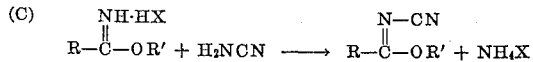

(D)

In these equations R and R' are defined as indicated hereinabove and X is halogen. As mentioned in said copending application suitable ortho ester reactants (Equation A) include trimethyl orthoformate, triethyl orthoformate, trimethyl orthoacetate, triethyl orthoacetate, trimethyl orthobenzoate, triethyl orthobenzoate, trimethyl-2-chloro-orthoacetate, triethyl-2-chloroorthoacetate, trimethyl-p-chloroorthobenzoate, trimethyl-p-bromoorthobenzoate, trimethyl-p-nitroorthobenzoate, trimethyl ortho-p-toluate, trimethyl 2-phenyl-orthoacetate, triethyl-2-carbethoxy orthoacetate and the like; illustrative ketene acetal reactants (Equation B) are carbethoxy ketene diethyl acetal, benzoyl ketene diethyl acetal and cyano ketene diethyl acetal; typical imidate hydrohalide reactants (Equation C) include the salts of: ethyl acetimidate, isopropyl acetimidate, ethyl propionimidate, ethyl butyrimidate, methyl isopropionimidate, methyl benzimidate, ethyl-α-phenyl acetimidate, methyl-α-chloroacetimidate, ethyl-α-chloropropionimidate, methyl laurimidate, ethyl-m-nitrobenzimidate and the like; and the corresponding free bases (Equation D) obtained by treating the imidate hydrohalides with suitable inorganic bases.

Suitable N-cyanoimidates which may be employed in the process of this invention include methyl N-cyanoacetimidate, methyl 2-chloro-N-cyanoacetimidate, ethyl 2-chloro-N-cyanoacetimidate, methyl N-cyanobenzimidate, ethyl 2-carbethoxy-N-cyanoimidate, ethyl N-cyanoformimidate, and the like.

Generally, the N-cyanoimidate is mixed with an alkali metal cyanamide in approximately equimolar quantities in an inert reaction medium such as methanol, ethanol and the like at room temperature. After a suitable reaction period, usually up to several hours, the inert reaction medium is removed and the residue is washed. The he crude N,N'-dicyanoamidine alkali metal salt may be used as such or may be further purified in a conventional manner, e.g., recrystallization or the like.

The N,N'-dicyanoamidine alkali metal salts prepared by the process of this invention which are usually high melting solids are valuable intermediates for the preparation of copper derivatives of N,N'-dicyanoamidines. Such copper derivatives demonstrate activity as fungicides. In addition, the N,N'-dicyanoamidine alkali metal salts are useful as intermediates for the synthesis of 2-amino-4-chloro-s-triazines by treatment with hydrogen chloride, 2,6-diamino-s-triazine-1-oxides by treatment with hydroxylamine hydrochloride and 1-arylisoguanamines by treatment with an aryl amine hydrohalide.

Generally, any alkali metal cyanamide may be employed. Preferably, sodium cyanamide is used rather than potassium cyanamide or lithium cyanamide in view of its ready availability. Frequently, impurities not easily removable from the alkali metal cyanamide reactant are carried along during the process thereby causing some contamination of the final product. Since the crude N,N'-dicyanoamidine alkali metal salts may often be used as intermediates in such form, further purification may not always be necessary.

In order to illustrate the present invention, the following non-limiting examples are given.

EXAMPLE 1

*Sodium N,N'-dicyanoacetamidine*

To a solution of 10.0 g. (0.10 mole) of methyl N-cyanoacetimidate in 50 ml. of methanol is added 6.5 g.

(0.10 mole) of purified sodium cyanamide. Upon shaking, a clear warm solution forms. After an hour at 40° C. the methanol is removed at reduced pressure and the pale yellow solid residue is washed with cold ethanol. The yield of product having a purity of approximately 90% is 10.45 g. (79%), M.P. 244–245° dec. The reported M.P. is 262–263°.

*Analysis.*—Calculated for $C_4H_3N_4Na$: C, 36.93; H, 2.32; N, 43.07. Found: C, 36.34; H, 2.31; N, 42.12.

EXAMPLE 2

*Sodium N,N'-dicyanoformamidine*

A solution of 1.0 g. of ethyl N-cyanoformimidate in 10 ml. of methanol is treated with 0.65 g. of sodium cyanamide and worked up as in Example 1 to afford 1.10 g. (93%) of product of approximately 90% purity, M.P. 253–255° dec.

*Analysis.*—Calculated for $C_3HN_4Na$: C, 31.05; H, 0.87; N, 48.28. Found: C, 30.33; H, 2.22; N, 46.07.

EXAMPLE 3

*Sodium 2-carbethoxy-N,N'-dicyanoacetamidine*

To a solution of 0.70 g. of 90% sodium cyanamide (0.010 mole) in 10 ml. of methanol is added 1.8 g. of ethyl 2-carbethoxy-N-cyanoacetimidate. The solution is kept at 45–50° C. for 10 minutes and then evaporated under vacuum. The resulting gum crystallizes upon prolonged scratching with a glass rod. The solid is washed with ether, dissolved in acetonitrile, filtered to remove a small amount of insoluble material and again evaporated to a gum. The latter crystallizes upon treatment with hot benzene giving 1.60 g. (80%) of analytically pure product, M.P. 155–165° dec.

*Analysis.*—Calculated for $C_7H_7N_4O_2Na$: C, 41.59; H, 3.49; N, 27.72. Found: C, 41.84; H, 3.28; N, 27.75.

EXAMPLE 4

*Sodium N,N'-dicyanolauramidine*

The procedure of Example 1 is repeated in all essential respects except that 23.8 g. (0.1 mole) of methyl N-cyanolaurimidate are employed and there is obtained a good yield of sodium N,N'-dicyanolauramidine.

EXAMPLE 5

*Sodium N,N'-dicyanobenzamidine*

The procedure of Example 1 is repeated in all essential respects except that 16.0 g. (0.1 mole) of methyl N-cyanobenzimidate are employed and there is obtained a good yield of sodium N,N'-dicyanobenzamidine.

While the present invention has been described in detail as to specific embodiments thereof, it is not intended that these details constitute undue limitations upon the scope of the invention, excepting, of course, insofar as these limitations appear in the appended claims.

We claim:

1. A process for preparing an N,N'-dicyanoamidine salt of the formula:

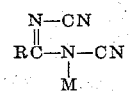

in which R is selected from the group consisting of phenyl and halo-, nitro- and alkyl-substituted phenyl and M is an alkali metal which comprises bringing into reactive contact at a temperature of from about 0° C. to about 50° C. an N-cyanoimidate of the formula:

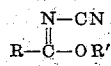

in which R is as defined hereinabove and R' is lower alkyl with an alkali metal cyanamide of the formula:

MHNCN in which M is as defined hereinabove.

2. A process as in claim 1 in which reactive contact is established in an inert reaction medium.

3. A process as in claim 2 in which R and R' are each methyl and M is sodium.

4. A process as in claim 2 in which R is hydrogen, R' is ethyl and M is sodium.

References Cited by the Examiner

UNITED STATES PATENTS 3,198,829   8/1965   Shaw _____ 260—551

OTHER REFERENCES

Houben-Weyl: "Methoden der Organischen Chemie," 4th ed., Band VIII, pages 702–703, Georg Thieme Verlag, Stuttgart, Germany (1962).

Huffman et al.: J. Org. Chem., 28, pp. 1812–16 (1963).

Shaw: Journal of Organic Chemistry, vol. 27, pages 3890 to 3996, November 1962.

WALTER A. MODANCE, *Primary Examiner.*

JOHN RANDOLPH, *Examiner.*

H. I. MOATZ, *Assistant Examiner.*